United States Patent Office 3,746,580
Patented July 17, 1973

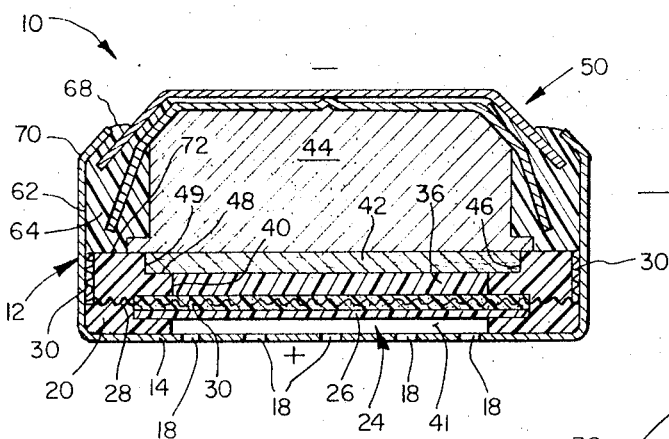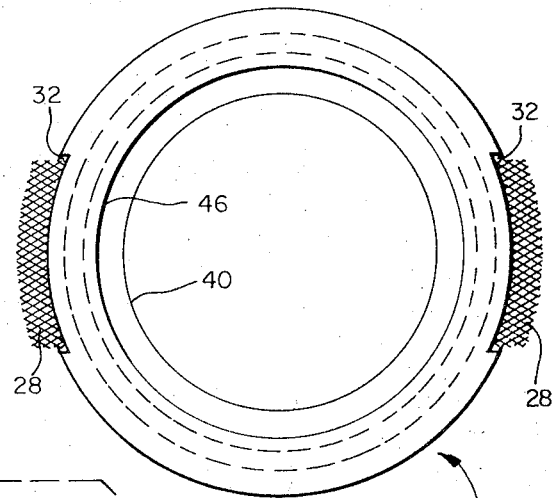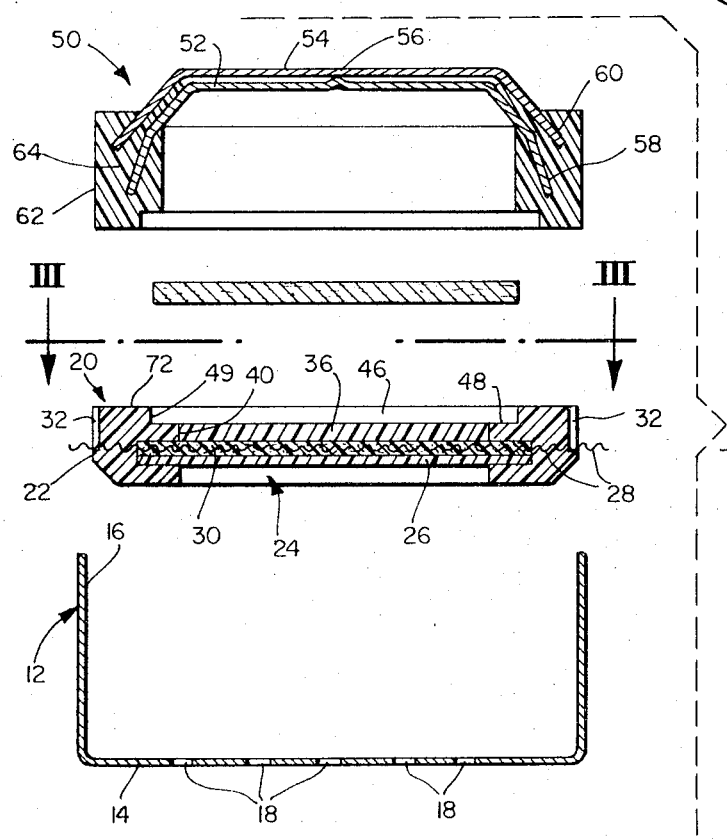

3,746,580
GAS DEPOLARIZABLE GALVANIC CELL
Wesley E. Aker, Malvern, and Robert J. McCormick, Yardley, Pa., assignors to ESB Incorporated, Philadelphia, Pa.
Filed Aug. 19, 1971, Ser. No. 173,067
Int. Cl. H01m 27/00
U.S. Cl. 136—86 A                          9 Claims

ABSTRACT OF THE DISCLOSURE

A gas-depolarizable galvanic cell having an insert molded cathode subassembly is disclosed. The cathode subassembly has portions thereof formed of electrically nonconductive material and a portion thereof comprised of a gas-depolarizable electrode.

BACKGROUND OF THE INVENTION

Field of the invention

This invention relates to gas-depolarized galvanic cells having an improved capacity per unit volume and more particularly to miniature cells of this type. The air-depolarizable cells of the invention will here be described in most detail in association with a hearing aid battery of the zinc-air type utilizing the casing and top closure arrangement of existing alkaline type hearing aid batteries, namely, the RAY-O-VAC 41G and 675R cells, since the air depolarizable cell of the invention has been particularly developed to improve the capacity of such existing cells, while at the same time, to utilize existing manufacturing facilities with a minimum of modification. The invention, however, is not limited to any particular size cell, nor is it limited to any particular choice of anode materials.

Description of the prior art

It may be explained that the mode of operation of gas-depolarized cells of the type here contemplated is well known, as for example, see the U.S. Pats. 2,848,525; 3,392,057; 3,415,685; and 3,489,616.

It may further be explained that gas depolarized cells have a relatively constant voltage on discharge, and in terms of capacity, have an excellent efficiency. Due to these factors, their use is desirable in many electronic devices as compared to other types of cells.

Also, the development of miniature electronic devices in ever decreasing sizes requires that the power sources which supply electrical energy to them also be reduced in size, otherwise, any advances in the miniaturization of the electronic circuits and components thereof will not be fully realized. Thus, the total electronic device "package" places strict volume limitations on the size of the power source for these devices, while at the same time, in many instances, requiring higher capacity than is normally available in present power sources.

As stated above, the preferred form of the present invention utilizes the casing and top closure arrangement of existing alkaline type hearing aid batteries. If desired, however, other casing and top closure arrangements may be employed. These hearing aid batteries generally comprise a metal casing or inner can and a top closure member therefor which, preferably, comprises a pair of metal plates or discs. The marginal portions of the inner can and of the top closure discs have an insulating sealing member or collar of elastic material interposed therebetween, a portion of the sealing collar extending around the edges of the discs and being continued for a short distance. An outer can or jacket encircles the inner can and is constricted at one end directly above the sealing collar to apply sealing pressure thereon, thereby defining a substantially air-tight enclosure for the cell. For a more complete description of this arrangement see U.S. Pat. #2,712,565. The principal advantage of the just described arrangement is that it limits electrolyte creepage to the top surface of the cell and the resultant formation of incrustations when the electrolyte becomes exposed to the atmosphere; such incrustations causing corrosion and an insulating film on the top of the cell which increases the contact resistance between the cell and any external circuit utilizing the cell.

While the above described construction provides a simple, but reliable, solution to the electrolyte creepage problem in such cells any additional means of further minimizing the possibility of electrolyte leakage and providing additional seals to prevent escape of electrolyte from the interior of the cell to the exterior of the cell would be welcome as an addition to the battery art.

SUMMARY OF THE INVENTION

It is an overall object of the present invention to provide a miniature air-depolarized galvanic cell having: a high ampere-hour capacity per unit of volume; minimum possibility of electrolyte leakage; and a construction which will permit the utilization of existing manufacturing equipment with a minimum of modification thereby permitting the manufacture of the cells of the invention on a practical and industrial scale, at a low cost, and without the need of designing completely new manufacturing facilities.

Briefly, the present invention produces a gas-depolarizable galvanic cell having a unique cathode subassembly. The cathode subassembly has portions formed of electrically nonconductive material and a portion thereof comprised of a gas depolarizable electrode. The cathode subassembly is disposed and occupies the lower portion of the casing of the cell. The casing has an open ended top and comprises one of the terminals of the cell. Anode material is situated within the casing and occupies the upper portion thereof. An electrolyte is provided that is in ionic contact with the electrode and the anode material, and a separator means is interposed between the electrode and the anode material. A top closure subassembly is disposed within the open ended top of the casing and includes at least one metal plate and an insulative sealing member. The sealing member is confined between: cooperating portions of the metal plate and the electrically nonconductive portions of the cathode subassembly; and cooperating portions of the casing and the metal plate. The metal plate comprises the other terminal of the cell and is electrically disconnected from the casing by the sealing member. By this arrangement, first and second sealing zones are provided in the cell which minimizes electrolyte leakage from the interior of the cell to the exterior of the cell.

The above and other objects and advantages of the invention will become more fully apparent from the following detailed description of the preferred embodiment of the invention when taken in conjunction with the accompanying drawings which form a part of the specification.

BRIEF DESCRIPTION OF THE DRAWINGS

FIG. 1 is a cross-sectional view of the gas depolarizable galvanic cell according to the invention, in completely assembled condition;

FIG. 2 is an exploded cross-sectional view of the structural parts of the cell in accordance with the invention; and FIG. 3 is a view of the cathode subassembly of FIG. 2 taken along the lines III—III of FIG. 2.

DESCRIPTION OF THE PREFERRED EMBODIMENT

It may be pointed out here that all reference to gas depolarizable, air depolarizable, atmospheric oxygen, ambient gas, etc. both above and hereinafter are meant to include all of the concepts included in the terms metal/air and metal/oxygen cells. Also, while specific reference to particular anode and cathode materials and other materials for the various parts of the cell of the invention will be made, any other suitable materials may be employed.

Referring now to the drawings, wherein like reference numerals refer to like parts throughout the several views, there is illustrated the gas-depolarizable cell in accordance with the invention, shown generally at 10. A cylindrical can or casing is shown at 12. The casing 12 constitutes the positive terminal of the cell and has a bottom wall 14 integral with the casing walls and an opposite open top 16. The casing 12 is provided with a plurality of air or gas entry openings 18. The casing 12 may be formed of nickel-plated steel or any other suitable material.

Situated within the casing 12 is a cathode subassembly shown generally at 20. The cathode subassembly occupies the lower portion of the casing 12. The cathode subassembly comprises an annular ring or frame 22, preferably formed in a mold, of electrically nonconductive material, as for example, a polymer. The annular ring is formed with an air or gas depolarizable electrode, shown generally at 24, disposed within the central opening thereof with the peripheral portions of the electrode 24 being wholly embedded within the confines of the frame 22. This may be accomplished, for example, by first forming the air electrode 24 in a separate operation and, thereafter, utilizing insert molding techniques to provide a composite unit comprising the frame 22 and the air electrode 24.

The preferred air electrode is prepared according to copending application Ser. No. 859,221 to David P. Boden et al. filed July 14, 1969 and now abandoned. The air electrode 24 has one surface 26 comprised of hydrophobic polymer film such as a microporous fluorocarbon polymer film, i.e., polytetrafluoroethylene. The surface 26 is directly exposed to ambient gas or atmospheric oxygen, which enters the cell 10 through gas entry openings 18, during cell discharge. On the interior surface of the electrode 24 is a metallic grid or screen 28, preferably of nickel, onto which is pressed a porous, wet or liquid proofed catalyst composition 30 comprising carbon and a wet polymer, i.e., polytetrafluoroethylene, wax, etc. The metallic screen 28 comprises a current collector and a portion of the screen 28 extends through the frame 22 and is folded up along the outer periphery of the frame 22, as at 30 (FIG. 1); a notched portion 32 is provided on either side of the frame 22 to partially accommodate the thickness of the screen 28. As will be understood from the foregoing, the air electrode 24 is comprised of the metallic grid 28, the liquid proofed catalyst composition 30 and the surface 26 comprised of the hydrophobic polymer film.

When the cathode subassembly is pushed into the casing 12 in a subsequent phase of the assembly of the cell 10, the extending portions of the metallic grid 28 not only provide a mechanical or force fit but also provide electrical contact between the air electrode 24 and the casing 12.

A separator in the form of a coating 36 is provided on the electrode 24. The preferred separator coating 36 is prepared according to the techniques of copending application Ser. No. 126,103 to John J. Kelley et al. filed Mar. 19, 1971 and now abandoned, and is applied to the air electrode after the molding formation of the composite unit comprising the frame 22 and the air electrode 24. In accordance with the teachings of this latter application, the separator is prepared as a solution of a high molecular weight polyacrylic acid in de-ionized water. The solution is placed in a dessicator and placed under vacuum until the mass is bubble free. The solution is gelatinous and thixotropic. A charge of the separator gel is applied into the central pocket 40 formed in the frame 22 and defined by the upper innermost marginal surfaces of the frame 22 and the area above the electrode 24. It will be noted that by this arrangement there is a complete sealing of the active catalyst area of the cathode of the cell 10 by the separator coating 36.

The lower innermost surfaces of the frame 22 and the area below the air electrode 24 define a reservoir for gas or an air space 41 at the cell's bottom which is in communication with the gas entry openings 18. This space 41 permits the starting and the maintenance of the electrochemical cell reaction.

Disposed above the separator 36 is a second separator 42. In the preferred embodiment of the invention, a compacted amalgamated zinc powder or pressed zinc pellet 44 is used as the anode material. The separator 42 is thus required. If, however, a zinc gel is utilized as the anode material of the cell, the separator 42 may be omitted. As an example of a zinc gel suitable for use in the cell without the separator 42, a finely divided zinc powder and polyacrylic acid in a potassium hydroxide solution may be used. The zinc gel would be placed in the cavity of the casing 12 disposed above the cathode subassembly 20 thus occupying the upper portion of the casing. The separator 42 is an electrolyte-absorbing separator carrying the electrolyte of the cell. As a matter of example, the electrolyte preferably comprises an alkali metal hydroxide also containing a suitable amount of dissolved zinc. If both separators 36 and 42 are used or if only the separator 36 is used (depending on choice of anode materials), in either event, the electrolyte of the cell will be in ionic contact with the electrode 24 and the anode material.

The separator 42 may be comprised of any suitable material, as for example, Pellon or Webril. The separator 42 is disposed in a second central pocket 46 provided in the frame and defined by annular ledge 48, the annular surface 49 and the area above the separator 36. The pocket 46 provides a locating position for the separator 42 and a well for the electrolyte for maintaining both during stages of production prior to closing the cell by means of the top closure subassembly 50.

The top closure subassembly 50 is disposed within the open ended top 16 of the casing 12. The top closure subassembly comprises at least one metal disc or plate, and preferably two dished discs as shown in the drawings at 52 and 54. The inner disc 52 is formed of or is plated with a metal having a low contact potential with respect to zinc, as for example, tin plated steel. The outer top disc 54 is formed of or is plated with a metal having good corrosion resistance to the electrolyte, a suitable material being nickel-plated steel. These dished discs have their center portions so formed that the inner disc 52 will be nested in the outer disc and will form a tight friction-fit therewith in order to maintain the two discs in good and permanent electrical contact with each other. If desired, the two discs may be spot-welded together as indicated at 56 to positively exclude any relative displacement thereof. The outer edges 58, 60 of the discs 52, 54, respectively, are slightly separated from each other and encompass an acute angle therebetween. The discs 52, 54 are in electrical contact with the anode material 44 and constitute the negative terminal of the cell. The top closure subassembly 50 further comprises the insulative sealing member or collar 62. The collar 62 may be comprised of any suitable material such as polyethylene or nylon and is provided for insulating the top discs from the casing 12 and, further, to provide an air tight enclosure with the casing 12.

Sealing collar 62 comprises a first or body portion 64 which extends between the upper surface 72 of the cathode subassembly 20 and the circumferential edge of inner top disc 52. A second or sleeve portion 68 of the collar 62 extends along the surface of the outer top disc 54 (FIG. 1). When the top closure subassembly 50 is located within the casing 12, the casing 12 encircles the marginal regions of the top discs 52, 54.

At the top end, the edge of the casing is crimped inwardly as indicated at 70 (FIG. 1). It can be seen that the crimping will apply axial compression on body portion 64 of collar 62 and will, at the same time, apply compression in a generally radial direction upon the sleeve portion 68 of the sealing collar 62. Thus, the collar 62 is confined, when in place in the cell 10, between: cooperating portions of the discs 52, 54 and the electrically nonconductive portions of the cathode subassembly, namely, annular surface 72; and cooperating portions of the casing 12 and the discs 52, 54. Consequently, the collar 62 provides a first sealing zone between the cooperating portions of the discs 52, 54 and the annular surface 72 of cathode subassembly 20, and a second sealing zone between cooperating portions of the casing 12 and the discs 52, 54 while maintaining the casing 12 and the discs 52, 54 electrically disconnected from each other.

If a compacted zinc powder or porous zinc pellet, which has the property of imbibing electrolyte into its interstices is utilized as the anode material, the formation of the pellet may be accomplished within the top closure subassembly 50 or the pellet may be formed separately and be inserted into and form a part of the top closure subassembly 50 for ease in handling during manufacturing operations. The top closure subassembly 50, as shown in FIG. 2, may be formed in a suitable molding operation.

As will be understood from the foregoing, the cathode subassembly comprises an important aspect of the present invention. Its use facilitates manufacturing operations while at the same time providing an important constructional component of the cell 10. The cathode subassembly provides a stable, rigid component which is easily handled, oriented, and adapted to mass production requirements. It provides a support for an otherwise mechanically unstable gas electrode 24 during insertion into the casing 12 and during periods of high stress experienced in the closure of the cell, i.e., the crimping operation. It provides a fixture or enclosure for the gas electrode 24 to prevent leakage around the electrode periphery and/or through the current collector inersticies. It provides a support for the extended electrode current collector which is press fitted against the walls of the casing 12 for electrical contact, eliminating the need for spot welding the current collector to the casing 12. Finally, and importantly, it provides a surface 72 which will support a compression seal with the body portion 64 of the collar 62 and which is adaptable to a range of auxiliary sealing possibilities (e.g., chemical, heat, ultrasonic, etc.). In other words, the mating surfaces of the body portion 64 of collar 62 and of the cathode subassembly 20 may be sealed to each other by means other than merely a mechanical seal, if desired. This is not generally possible in prior art constructions of conventional cells of the type here contemplated. Therefore, the first sealing zone, namely, between the mating surfaces of the body portion 64 of collar 62 and of the cathode subassembly 20 described above, provides an improved seal at this location over prior art constructions utilizing the top closure arrangement described and a comparable seat or flange to the surface 72 which must be present in order to utilize such a top closure arrangement.

Having thus described our invention, we claim:

1. A gas-depolarizable galvanic cell comprising:
  (a) a metal casing constituting one of the terminals of the cell, the casing having a bottom integral with the casing walls and an opposite open-ended top, said casing having at least one gas entry opening therein;
  (b) a cathode subassembly situated within the casing, the cathode subassembly occupying the lower portion of the casing and having a frame formed of electrically non-conductive material molded around the edge of a gas-depolarizable electrode, means electrically connecting the gas-depolarizable electrode to the casing, and said gas-depolarizable electrode being exposed to ambient gas entering into the casing through the gas entry opening thereof;
  (c) anode material situated within the casing and occupying the upper portion thereof disposed above the cathode subassembly;
  (d) an electrolyte in ionic contact with the gas-depolarizable electrode and the anode material;
  (e) separator means interposed between the gas-depolarizable electrode and the anode material;
  (f) a top closure subassembly disposed within the open-ended top of the casing, the top closure subassembly comprising at least one metal plate in electrical contact with the anode material and constituting the other terminal of the cell, and an insulative sealing member molded around the edge of the top closure;
  (g) the insulating sealing member abutting the frame molded around the edge of the gas-depolarizable electrode to form a first sealing zone therewith; and
  (h) the edge of the casing around the open-ended top being crimped inwardly upon the insulative sealing member of the top closure to form a second sealing zone while maintaining the casing and the top closure subassembly electrically insulated from each other.

2. The cell of claim 1 in which the insulating sealing member and the gas-depolarizable electrode frame form a mechanical seal by means of compression.

3. The cell of claim 1 in which the insulating sealing member is bonded to the gas-depolarizable electrode frame.

4. The cell of claim 1 in which the gas-depolarizable electrode comprises a current collector and a catalyst composition applied thereto, a portion of said current collector extending through said frame, a notched space in the side of said frame to partially accommodate the thickness of the current collector, and said current collector being folded up along the side of said frame whereby it is held by compression in electrical contact with the casing which functions as the cathode terminal.

5. The cell of claim 4 in which the gas-depolarizable electrode comprises a metallic screen as the current collector with a liquid-proofed catalyst applied thereto and a microporous, hydrophobic polymer film applied to the electrode surface adjacent to the gas entry opening.

6. The cell of claim 5 in which the separator means comprises a coating of a polymer on the surface of the gas-depolarizable electode isolating it from contact with the anode material which comprises an alkaline electrolyte solution containing finely divided zinc powder.

7. The cell of claim 5 in which the separator is an absorbent material and the anode material comprises zinc powder formed into a porous pellet.

8. The cell of claim 6 in which the top closure subassembly comprises two metal plates having the insulative sealing member molded around the edge of both metal plates.

9. The cell of claim 7 in which the top closure subassembly comprises two metal plates having the insulative sealing member molded around the edge of both metal plates.

References Cited

UNITED STATES PATENTS

| | | | |
|---|---|---|---|
| 2,644,024 | 6/1953 | Schumacher et al. | 136—136 |
| 3,133,837 | 5/1964 | Eidensohn | 136—86 R |
| 3,418,172 | 12/1968 | Fletcher | 136—111 |
| 3,436,270 | 4/1969 | Oswin et al. | 136—86 A |
| 3,457,117 | 7/1969 | Angelovich | 136—133 |

WINSTON A. DOUGLAS, Primary Examiner

H. A. FEELEY, Assistant Examiner